F. F. STRONG.
PULP SEPARATOR.
APPLICATION FILED JULY 25, 1911.
1,023,280.
Patented Apr. 16, 1912.
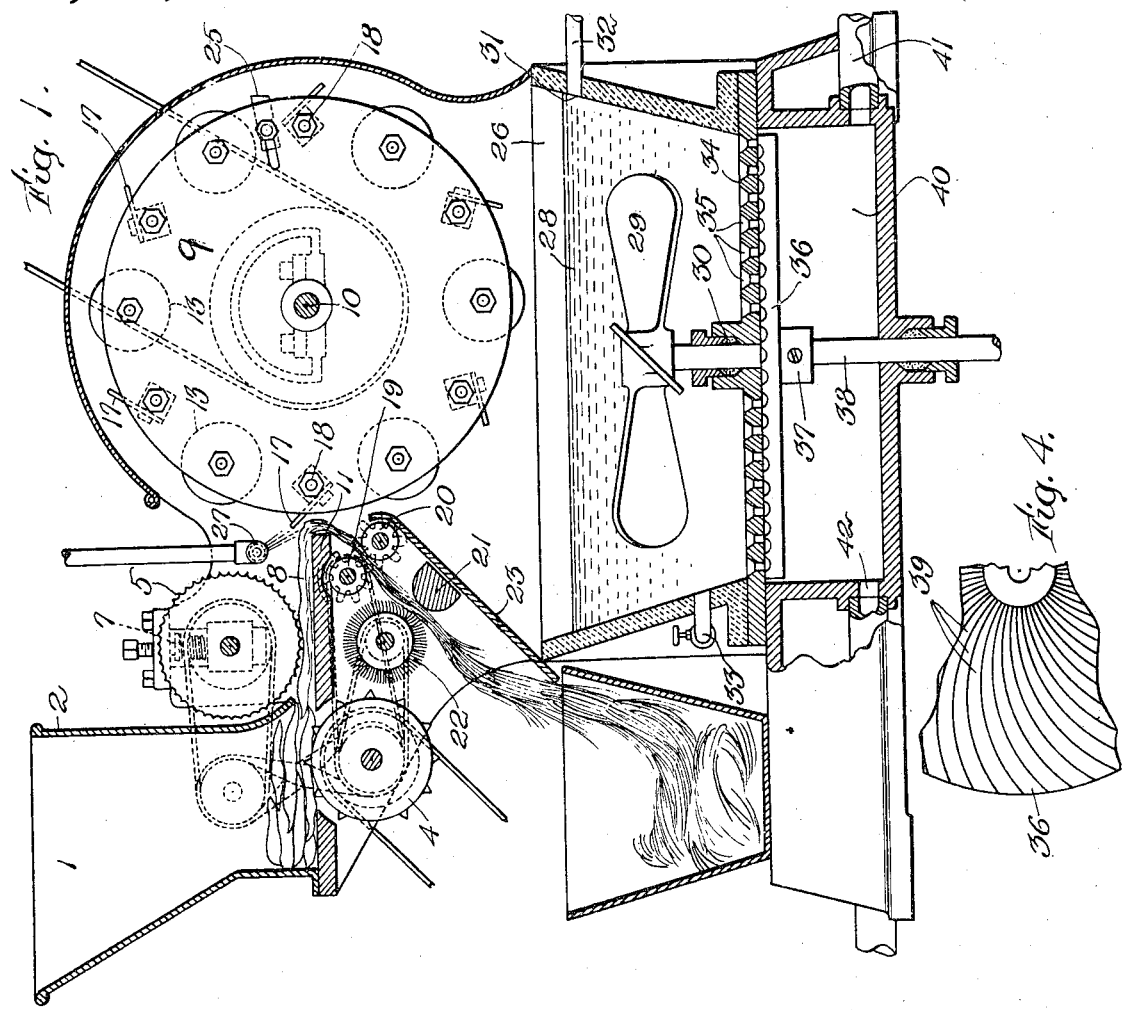
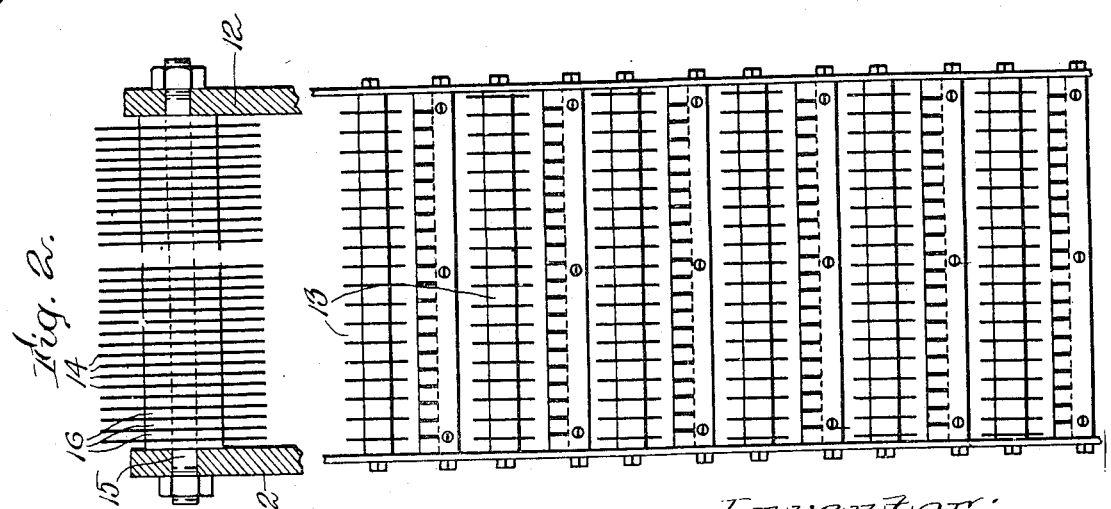
Witnesses:
Wm. J. Pike
M. J. Spalding
Inventor:
Frederick F. Strong.
by Geo. S. Maxwell,
Attorney.

UNITED STATES PATENT OFFICE.

FREDERICK F. STRONG, OF ST. PETERSBURG, FLORIDA.

PULP-SEPARATOR.

1,023,280. Specification of Letters Patent. Patented Apr. 16, 1912.

Original application filed June 10, 1910, Serial No. 566,221. Divided and this application filed July 25, 1911. Serial No. 640,462.

*To all whom it may concern:*

Be it known that I, FREDERICK F. STRONG, a citizen of the United States, residing at St. Petersburg, in the county of Hillsboro and State of Florida, have invented an Improvement in Pulp-Separators, of which the following description, in connection with the accompanying drawings, is a specification, like letters on the drawings representing like parts.

This invention relates to the making and preparation of pulp from fibrous material, being a division of my application Ser. No. 566,221 filed June 10, 1910.

The present apparatus, although adapted to more or less general use, is particularly intended for handling such plants as are common in the southern part of the United States, whereby the rapid and economical production of commercial commodities such as crude paper pulp, raw material for the manufacture of artificial hard rubber or ivory and vulcanized fiber, is rendered practicable from the leaves, leaf stalks stem sheaths, trunk wood and roots of such plants and trees. The pulp having been pushed from between contiguous fibers, is delivered into the separator which constitutes the subject matter of this divisional application. The separator comprises means to finely comminute the plant material, gravity means for separating the chlorophyl and juices from the pulp mass, including a receptacle containing liquid for holding the comminuted plant material in suspension, and a stirrer for facilitating the separation of the lighter parts from the heavier parts by gravity. In its preferred embodiment I provide a grinding plate in the bottom, which, in connection with the stirrer and gravity separator, produces the highly subdivided product desired.

In the drawings, in which I have shown a preferred embodiment of my invention, Figure 1 is a vertical longitudinal sectional view of one form of the complete machine, parts being broken away for clearness of illustration: Fig. 2 shows in enlarged front elevation one of the mechanical dissector rolls; Fig. 3 is a view partly diagrammatic showing a projection of the drum with its successive portions laid out in a plane so as to exhibit their mutual relation; and Fig. 4 is a fragmentary plan view of the grinding scraper or pulp reducer.

In order that my invention may be better understood, I will describe the same in connection with the complete apparatus.

The raw material, consisting of leaves and stalks and other portions of the plant, is delivered into a hopper 1 whose vertical front wall 2 and rear sloping walls 3 aid the stalks in alining themselves endwise to be fed forward by a spiked under feed roll 4 and upper fluted or grooved feed roll 5 whose journals 6 are yieldingly held at 7 with relation to the stream of fiber 8 as the latter is fed forward to the dissector reel 9 supported on its shaft 10. The material 8 projects from the edge 11 of the bed plate and is rapidly whipped and subdivided by the coöperating action of the dissector. Between the heads or ends 12 of the member 9 a series of dissector rolls 13 is mounted, each consisting of a series of metal disks 14 on a shaft 15 separated by spacing washers 16 arranged in staggered relation, as clearly shown in Fig. 3, where it will be seen that the corresponding knife-like fingers of the successive rolls are out of longitudinal alinement with each other. Between these successive cutter members 13 are combs 17 held in angular adjustment on transverse rods 18, said combs having relatively wide teeth and narrow slots, the reverse of the cutters, so as to push out from between the fibrous portions of the plant the pulp material. These combs are made of thin ribbon steel which yield sufficiently to provide a light combing blow to coöperate with the dissector rolls or knives to whip out the subdivided material into a fringe of fibers, which fibers are bent downwardly under the edge of the table or plate 11, where they are pulled forward by two small rolls 19, 20, which squeeze them together more or less as the fibers are fed over a supporting block 21 in position to be thoroughly brushed and fully cleaned by a brush roll 22. An apron 23 guides the cleaned and straightened fibers into the receptacle 24. In working certain kinds of fiber such as cabbage-palm leaves, saw palmetto, etc., it is desirable to cut the fiber into lengths, and accordingly a steel bar or knife 25 is adjustably supported radially in the dissector reel 9 for this purpose. The pulp cells and debris which are separated from the isolated fibers or fringe, are pushed and whipped off into the separator tank 26, being aided in their movement by jets of salt water driven from a transverse pipe 27 under pressure against the fiber at the point of dissecting. The rolls 19, 20, also serve the purpose of freeing such remaining juices and pulp as may be contained in the fibers passing between said rolls, which juices and pulp also fall into the tank 26. The tissue, etc., collected in the tank 26 is agitated in the salt water 28 therein by a suitable stirrer 29, herein shown as journaled at 30 vertically in the bottom of the receptacle. This mechanical stirring removes much of the microscopic chlorophyl granules, soluble pigments, and finely divided debris, which, being light, rise and pass through the meshes of a fine wire screen 31, and out through an outlet 32 in the side of the tub or receptacle 26, whence it passes to evaporating and settling tanks for further refining in the production of minor by-products. The material left in the tub consists of bits of torn fibers, together with the pulp or parenchyma cells more or less broken and mechanically freed from their green juice and chlorophyl, also bits of leaf cuticle and thin laminæ formed of skin cells free of chlorophyl and consisting of nearly pure tough cellulose, admirably adapted for the production of paper pulp. Being already in a more or less finely divided condition, they are easily reached and acted upon by any chemical agents used for refining or bleaching. When treated mechanically as thus far described, this pulp-like material is more or less bound together by its inherent resinous constituents, which it is one object of my invention to leave in the mass whereby the pulp is to a considerable extent self-sizing. In another concurrent application, I have described and claimed the process herein partially shown, and hence I will not enter more at length into a description thereof at this place. The pulp-like portion in the solution 28 gradually settles to the bottom as it is washed and separated by the stirrer 29, the proper depth of solution being provided by any suitable means, as through a pipe 33 in addition to the washing solution at 27. The bottom 34 of the tank 36 is provided with a series of holes 35 for the passage of the pulp, which are preferably substantially closed at their lower end by a circular sub-bottom or scraper 36 secured at 37 to the shaft 38 which operates the stirrer. The upper surface of this scraper 36 is provided with a series of radial and preferably curved grooves or flutings 39; see Figs. 1 and 4, which operate to pull the pulp gently downward and outward as it settles in the holes 35 of the foraminous bottom of the tank. It is thus further macerated and refined and finally dropped into a collecting basin 40, whence it passes through a pipe 41 for its further treatment, an inlet pipe 42 being preferably provided for introducing further salt solution and facilitating the more rapid delivery of the pulp through the pipe 41. The finely subdivided tissue and pulpy matter which is held in the tank in solution is further washed and separated by the mechanical action of the stirrer and the lighter coloring matter and other light parts are drained off from the pulpy parts, the latter being then gently and yet rapidly squeezed, pulled, mashed and ground into such a subdivided state, that, when diluted or permitted to immerse properly with the liquid in the collecting tank, it will readily pass forward in a practically self-propelling stream.

It will be evident that my invention is capable of a wide variety of mechanical embodiments without departing from the spirit and scope of the invention as defined in the appended claims.

Having described my invention, what I claim as new and desire to secure by Letters Patent is, 1. In an apparatus of the kind described, means to finely comminute the plant-material, gravity means for separating the chlorophyl and juices from the pulp mass, including a receptacle containing liquid for holding the comminuted plant-material in suspension, and a stirrer for facilitating the separation of the lighter parts from the heavier parts by gravity.

2. In an apparatus of the kind described, means to finely comminute the plant-material, gravity means for separating the chlorophyl and juices from the pulp mass, including a receptacle containing liquid for holding the comminuted plant-material in suspension, and a stirrer for facilitating the separation of the lighter parts from the heavier parts by gravity, said receptacle having a foraminous bottom and a squeezing and grinding plate mounted to rotate transversely of the holes of said foraminous bottom.

3. In an apparatus of the kind described, means to finely comminute the plant material, comprising a tank for holding the plant material in liquid suspension, said tank having a foraminous bottom, and a ridged plate mounted to rotate on the under side of said bottom, whereby the ridges of said plate operate with a scraping action against the outlet walls of the holes in the tank-bottom to cut off and scrape away the pulp material which settles into said holes from the contents of the tank.

4. In an apparatus of the kind described, means to finely comminute the plant material, comprising a tank for holding the plant material in liquid suspension, said tank having a foraminous bottom, and a spirally grooved plate mounted to rotate on the under side of said bottom, whereby the intervening ridges between said grooves operate with a scraping action against the outlet walls of the holes in the tank-bottom to cut off and scrape away the pulp material which settles into said holes from the contents of the tank, said scraped-off and severed pulp material being directed to the periphery of the plate by said spiral grooves and at the same time subjected to a further grinding action.

In testimony whereof, I have signed my name to this specification, in the presence of two subscribing witnesses.

FREDERICK F. STRONG.

Witnesses:
WALTER ROBERTSON HOWARD,
H. E. ELLIS.